United States Patent
Chembrammel et al.

(10) Patent No.: US 12,346,847 B2
(45) Date of Patent: Jul. 1, 2025

(54) MATERIAL MOVEMENT INCORPORATING REAL-TIME TRACKING OF A MACHINE ACCORDING TO AN OPTIMIZED SEQUENCING PLAN

(71) Applicant: Caterpillar Inc., Peoria, IL (US)

(72) Inventors: Pramod Chembrammel, Mahomet, IL (US); Dustin J. Funk, Edwards, IL (US); Andrew C. Heebink, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 132 days.

(21) Appl. No.: 17/959,815

(22) Filed: Oct. 4, 2022

(65) Prior Publication Data

US 2024/0112099 A1    Apr. 4, 2024

(51) Int. Cl.
*G06Q 10/0631* (2023.01)

(52) U.S. Cl.
CPC .............................. *G06Q 10/0631* (2013.01)

(58) Field of Classification Search
CPC .................................................. G06Q 10/0631
USPC ........................................................ 705/7.12
See application file for complete search history.

(56) References Cited

U.S. PATENT DOCUMENTS

| | | | | |
|---|---|---|---|---|
| 5,924,493 A * | 7/1999 | Hartman | ............... | E02F 9/2025 |
| | | | | 701/50 |
| 10,657,464 B2 * | 5/2020 | Nettleton | ............... | G06Q 10/00 |
| 10,965,401 B2 * | 3/2021 | Goektepe | ............. | H04L 1/0045 |
| 11,236,492 B1 * | 2/2022 | Ready-Campbell | .... | E02F 9/267 |
| 2019/0301138 A1 * | 10/2019 | Sherlock | ................. | F16L 1/036 |
| 2020/0208995 A1 * | 7/2020 | Hou | ........................ | G01C 21/34 |
| 2020/0362531 A1 * | 11/2020 | Ready-Campbell | .... | E02F 3/434 |
| 2021/0034058 A1 * | 2/2021 | Subramanian | .......... | G06T 17/05 |

(Continued)

FOREIGN PATENT DOCUMENTS

| | | |
|---|---|---|
| CN | 1601539 A | 3/2005 |
| CN | 100538734 C | 9/2009 |

(Continued)

OTHER PUBLICATIONS

Mr Con Cronin, Design and Development of a Material Handling System for an Autonomous Intelligent Vehicle for Flexible Manufacturing, 30th International Conference on Flexible Automation and Intelligent Manufacturing (FAIM2021) Jun. 15-18, 2021, Athens, Greece, Direct science (Year: 2021).*

*Primary Examiner* — Abdallah A El-Hage Hassan

(57) ABSTRACT

A system and method are described for moving a material volume to a specified destination, by a system including sensor data sources, a trip sequence planning system, and a controllable material mover. Sensor data sources provide, in real-time, terrain sensor data pertaining to the material volume to be moved to the specified destination. The system generates, based on the terrain sensor data, a three-dimensional mapping of the material volume. The system updates, based on the three-dimensional mapping, a current tile pattern of the material volume. The system determines, by performing a trip sequence optimization routine based upon the updated tile pattern, at least a next block of material to be moved from the material volume, wherein the trip sequence optimization routine is performed in accordance with a k-partite map generated from the current tile pattern, and the k-partite map incorporates path limitations arising from physical accessibility of tiles of material.

20 Claims, 4 Drawing Sheets

(56) References Cited

U.S. PATENT DOCUMENTS

2021/0334720 A1\* 10/2021 Brockhurst ...... G06Q 10/06312
2023/0036849 A1\* 2/2023 Lu .......................... E02F 9/262

FOREIGN PATENT DOCUMENTS

| CN | 105956704 A | | 9/2016 | |
|----|-------------|---|--------|---|
| CN | 105636659 B | \* | 2/2018 | ............. E02F 3/435 |
| CN | 110619438 A | | 12/2019 | |
| CN | 110908381 A | | 3/2020 | |
| CN | 113095753 A | | 7/2021 | |

\* cited by examiner

MATERIAL MOVEMENT INCORPORATING REAL-TIME TRACKING OF A MACHINE ACCORDING TO AN OPTIMIZED SEQUENCING PLAN

TECHNICAL FIELD

The present disclosure relates generally relates to planning and executing operation of material moving equipment to carry out a pre-defined task of moving a specified material from an initial defined location (occupying a specified volume) to a further specified destination location. The present disclosure is applicable to any of a variety of material moving tasks/jobs that demand sequencing of operations of equipment without regard to whether the machinery is operated manually, semi-autonomously or autonomously. The applicable material moving equipment may be any of a wide variety of material hauling machines including, for example earthmoving machinery such as loaders and excavators.

BACKGROUND

Material moving operations involve moving a defined mass occupying a specified volume from a source location to a dump location. Two examples include: (1) moving material from a large pile to a crusher, and (2) moving material from a high wall blast site to a hopper. In both examples the source location has a large defined volume of loose material (e.g., stone, sand, sandstone, chalk, clay, coal, iron ore, copper ore, gypsum, etc.) that needs to be moved in a set of trips, carried out by moving equipment having a defined capacity (volume and/or weight), to the to the dump location. Each trip involves loading the moving equipment with material, carrying the material, and dumping the material at a specified destination. The specified destination may be other material transportation equipment, a storage location, or a receiving inlet for material processing equipment.

Semi-autonomous and autonomous equipment, in view of their potential for relatively greater efficiency, safety, reduced operating costs and uninterrupted operations, are increasingly being used, in place of manual equipment, in a variety of material moving operations including mines, quarries, construction, agriculture etc. The presence of such equipment, while providing a potential to enhance/optimize completion of tasks involving a series of performed material transport trips, relies upon specifying a proper/optimized sequence of such trips. Moreover, while an initial optimized sequence of trips may initially be defined, the actual execution of the trips will likely result in an intermediate state of the volume of material to be moved that deviates from the initially specified volume (e.g. a pile may collapse, resulting in a re-defined intermediate volume deviating from an initial volume upon which an optimized sequence of trips was defined).

SUMMARY

The disclosure provides, in one aspect, a method for performing a movement of a material volume to a specified destination location, by a system including sensor data sources, a trip sequence planning system, and a controllable material mover. The method includes acquiring, from the sensor data sources in real-time, terrain sensor data pertaining to a the material volume to be moved to the specified destination location. The system generates, based on the terrain sensor data, a three-dimensional mapping of the material volume to be moved. The system updates, based on the three-dimensional mapping, a current tile pattern of the material volume to be moved. The system determines, by performing a trip sequence optimization routine based upon the updated tile pattern, at least a next block of material to be moved from the material volume, wherein the trip sequence optimization routine is performed in accordance with a k-partite map generated from the current tile pattern, and wherein the k-partite map incorporates path limitation arising from physical accessibility of tiles of material during sequential removal of material of the material volume corresponding to the current tile pattern. Moreover, the method includes rendering directions to the controllable material mover in accordance with the determined next block of material to be moved from the material volume.

The disclosure provides, in another aspect, a system configured for performing a method for movement of a material volume to a specified destination location. The system comprises: sensor data sources; a trip sequence planning system; and a controllable material mover. The trip sequence planning system includes a processor and a non-transitory computer readable medium including computer-executable instructions that, when executed by the processor, facilitate carrying out a method that includes acquiring, from the sensor data sources in real-time, terrain sensor data pertaining to a the material volume to be moved to the specified destination location. The system generates, based on the terrain sensor data, a three-dimensional mapping of the material volume to be moved. The system updates, based on the three-dimensional mapping, a current tile pattern of the material volume to be moved. The system determines, by performing a trip sequence optimization routine based upon the updated tile pattern, at least a next block of material to be moved from the material volume, wherein the trip sequence optimization routine is performed in accordance with a k-partite map generated from the current tile pattern, and wherein the k-partite map incorporates path limitation arising from physical accessibility of tiles of material during sequential removal of material of the material volume corresponding to the current tile pattern. Moreover, the method includes rendering directions to the controllable material mover in accordance with the determined next block of material to be moved from the material volume.

DETAILED DESCRIPTION

Figure 1:
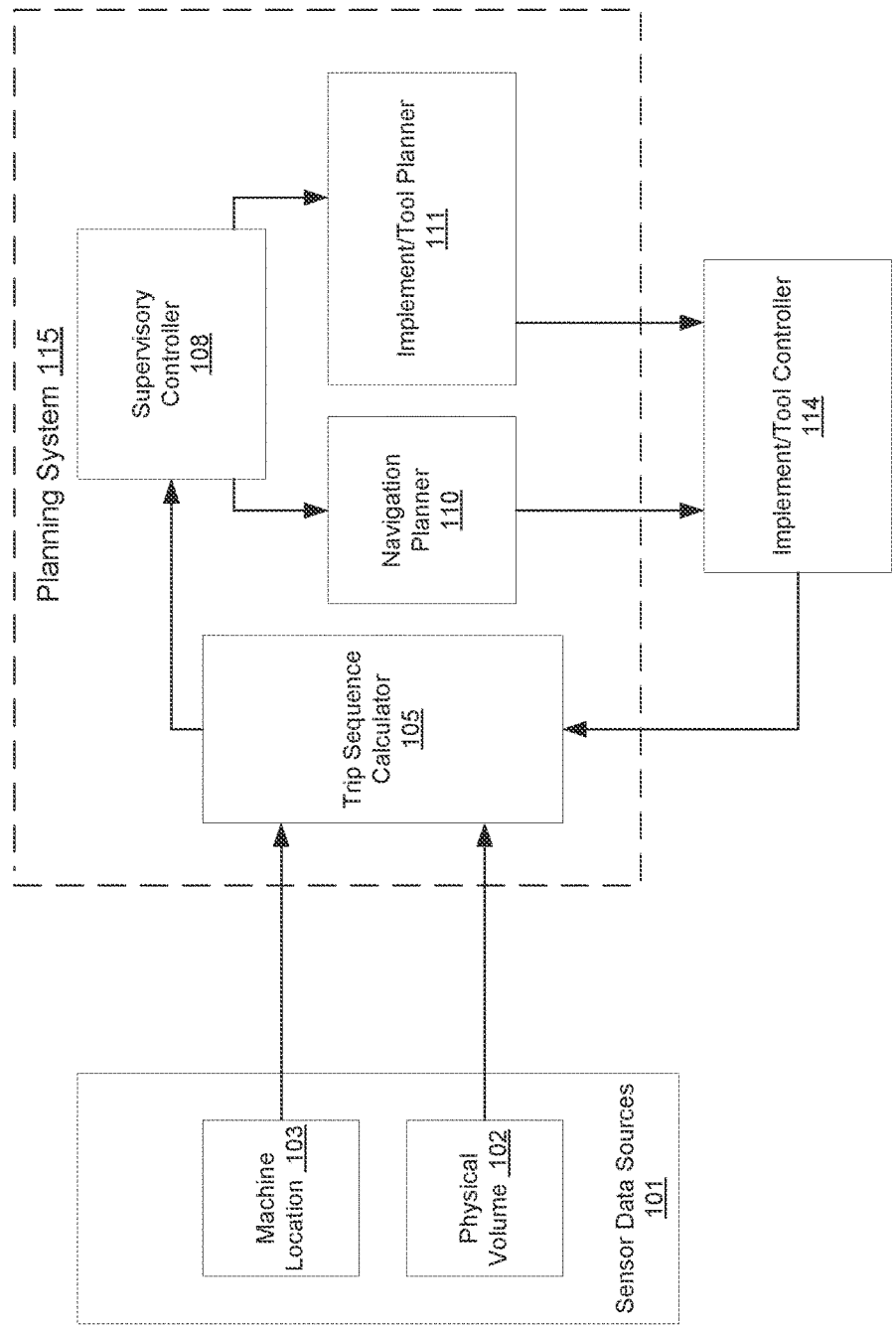
FIG. 1 schematically depicts an illustrative example of a system for carrying out a material moving operation comprising a plurality of trips in accordance with the current disclosure.

Efficient movement of an entire defined volume of material can be aided by optimal sequencing of trips carried out in the movement of the material by manual, semi-autonomous or fully autonomous equipment between a destination dump location and various, potentially evolving, next source material locations on the remaining portion of the defined volume of material. By way of example, such optimal sequencing results in operation of moving equipment in a manner that minimizes resources (e.g. machine operation time) expended during completion of moving the material from the source to the destination.

Moreover, to realize the benefits of optimal trip sequencing (e.g. a pre-calculated shortest total distance traveled during the sequence of trips between source and destination locations), there exists a need to provide an integrated system of sensors (e.g. moving equipment-mounted radar/LIDAR), processors/controllers, and a communication infrastructure supporting real-time data and control command transfers between the sensors and processors/controllers. Such integration enables real-time task completion updates with backend processing that supports real-time re-definition of remaining source material volume (and/or mass) and re-calculation of optimized trip sequencing based upon an intermediate state of the volume of material to be moved based upon real-time sensor data defining the remaining source material volume.

Thus, a system and method of operating such system, is described herein that facilitates integrated operation of sensors and a processing element(s) that computes an optimized set of trips for moving a defined volume of material from a source location to a destination.

The present disclosure provides an infrastructure and method carried out by the infrastructure that efficiently exploits autonomous vehicle operation and intelligent decision-making by integrating graph-theory based sequencing of material movement trips with a network of sensors, controllers and programmed processing equipment. More particularly the controllers direct and guide material moving equipment in accordance with optimized trip sequences determined by the processing equipment applying graph-theory computations to a defined volume of material to be moved to a specified destination. Sensors are employed both before and during the material moving operation to define a remaining volume of material to be moved to the specified destination.

Moreover, regarding production of an optimized trip sequence in accordance with a determined volume of material to be moved, such optimization occurs, in accordance with the present disclosure, in two aspects. In a first aspect, based on a variety of imaging sensors, a target volume of material is discretized into a finite number of sub-volumes of material (referred to herein as "dig-blocks"). A resulting overhead view pattern (see FIG. 3A) comprises a plurality of distinctly identified tiles in the overhead view—each identified tile corresponding to a volume moved during a particular trip sequence to be carried out by a material mover.

Figure 3A:
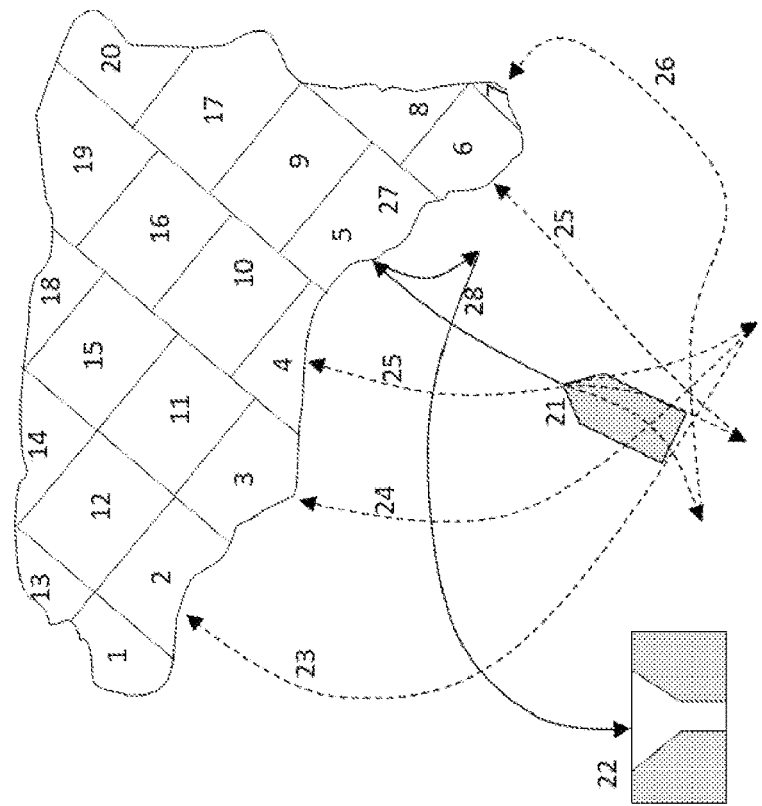
Figure 4A:
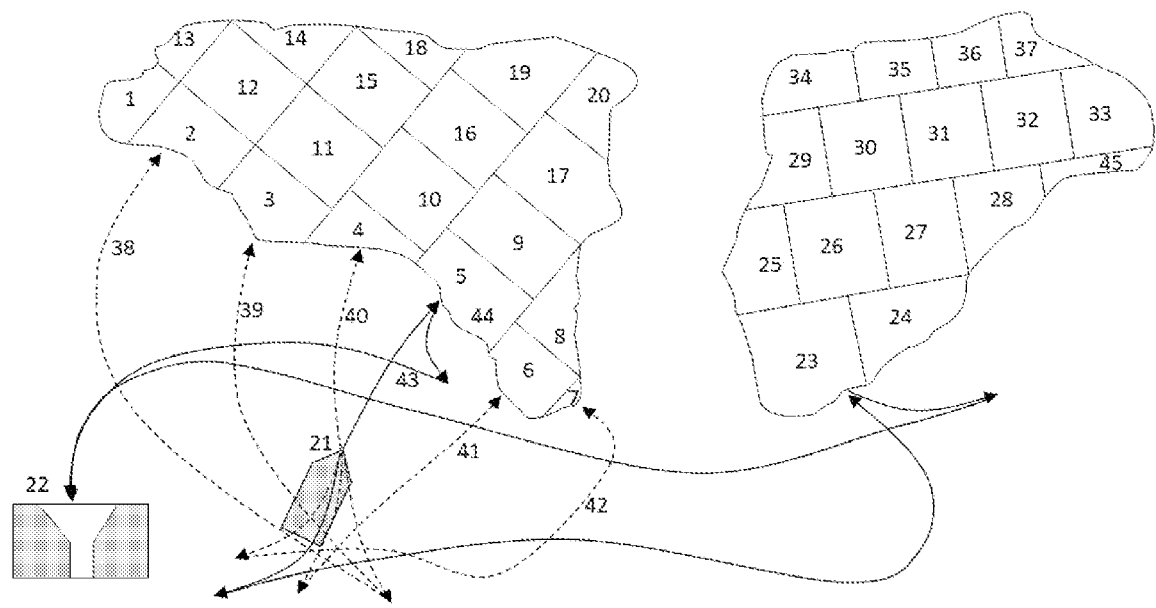
FIGS. 4A and 4B illustratively graphically depict a material movement operation in the form of an overhead view (FIG. 3A) depicting a discretization of the material at two source locations and an indicated destination location, and a corresponding k-partite graph (k=3) (FIG. 3B) in accordance with the current disclosure.

In a second aspect, an optimized trip sequence (e.g. a shortest accumulated distance of all trip segments) is determined from the discretized tile pattern established in accordance with the first aspect. More specifically, using the tile pattern, an iterative shortest total path algorithm is executed to identify a sequence of tile removal (moved to the destination location) resulting in an optimal (shorted total distance traversed) material movement operation. In accordance with the present disclosure, the tiles (representing the discretized material volume to be moved) are graphically represented using a dynamic k-partite graph (see FIGS. 3A and 4A) that can thereafter be used to calculate a shortest path using well-known optimization (shortest path) searching programs/techniques.

In the k-partite graphical representation, unexposed tiles are not considered candidates for removal of a next tile. Instead such tiles become candidates for a next removed tile when they have been exposed by moving the material of a neighboring tile. As exposed tiles are consumed, previously unexposed tiles are exposed and are considered to estimate the next-best-exposed-tile.

Sequential removal of material corresponding to identified tiles of a tile-patterned volume of material to be moved, is process can be represented as a dynamic k-partite graph. The nodes (vertices) of the graph represent the tiles of the patterned volume of material. Each of the (k−1) partitions of the nodes (vertices) of the graph represent different sources (e.g., different piles). Thus, one partition represents current equipment location and dump location. The use of k-partite graph ensures that, while finding the optimal sequence, movement of the equipment for material movement happens only between a candidate source location and the dump location. The dynamism in the graph happens since once a tile is consumed, the corresponding node is removed, and its connected nodes are marked exposed since those corresponding tiles will be exposed for digging.

During optimization of the trip sequence, a next tile in a sequence is determined, for example, by executing a recursive lowest cost algorithm on the k-partite representation of a current tile pattern for the volume of material to be moved. Execution of the recursive lowest cost algorithm, when completed, results in an optimized trip/tile removal sequence for the volume of material to be moved. The cost of each segment may be calculated based upon one or more perceived costs including, for example: travel time, fuel consumption, avoidance of corner loading during digging to ensure equipment stability.

Moreover, during the execution of a current iteration of an optimized trip sequence, the system is configured to take into consideration the physical dynamics of removing material from the volume of material to be moved. For example, material within a tile, as well as neighboring tiles, may shift as material is removed from the tile, resulting in a tile pattern that differs from the original definition due to shifting of material within a current tile pattern. Additionally, a particular load removal may result in less than an entire tile being removed from the current tile pattern upon which a current optimized trip sequence is based, resulting in a need to re-define the tile pattern in view of the presence of at least one partially removed tile.

Thus, during actual digging following this optimal sequence, the sensors mounted on the equipment constantly monitor changes in the volume of material to be removed that potentially cause a material change to the current tile pattern model of the material to be removed. If material volume tile pattern is determined, based on the process data from the sensors, to substantially deviate from the current tile pattern, the optimized trip sequence is recalculated, and operations are continued based upon the newly determined tile pattern and resulting updated optimized trip sequence.

Thus, in summary of the above described first and second aspects, the system is configured to continuously detect the extent of the remaining volume of material to be moved. In the event that the remaining volume of material deviates significantly from the tile structure of the current overhead view tile pattern, the above-mentioned first aspect and second aspect are re-determined to provide an updated optimized trip sequence in accordance with the newly defined tile arrangement of the current/remaining volume of material to be moved to the destination location. Moving equipment-mounted sensors detect changes to the volume of material as loads are moved—resulting in an updated tile pattern that substantially deviates from the current tile pattern from which a current optimized trip sequence has been determined. The system detects/determines the substantial deviation and invokes a procedure for generating an updated optimized trip sequence based on the updated tile pattern.

Having generally described aspects of a system for moving a volume of material in accordance with optimized trip segment sequencing in accordance with a sensed configuration of the volume of material to be moved by a moving equipment having a defined capacity, attention is directed to particular illustrative examples provided in the provided Figures.

Turning to FIG. 1, an exemplary system and operating environment is provided for carrying out a material moving operation comprising an optimized sequence of trips in accordance with the current disclosure. In accordance with the present disclosure, a trip sequence calculator 105 is configured to receive/obtain/acquire sensor data generated by a variety of sensor data sources 101. The acquired data includes, for example: (1) physical volume data 102—acquired from terrain sensors (e.g., LIDAR, visual cameras, and RADAR); and (2) machine location data 103 (source of the physical volume sensor data). The trip sequence calculator 105 is configured to acquire and integrate the sensor data 102 and 103 to render a current tile pattern. Thereafter, the trip sequence calculator 105, based upon the current tile pattern (determined to have substantially changed from a previous current tile pattern), renders an optimized trip sequence.

In accordance with the present disclosure, the sensor data sources 101 are, for example, mounted on a material moving machine (e.g. the machine carrying out the material moving operation on the volume of material to be moved) such that a wide field of view is covered to capture terrain data needed to determine/define a physical space/volume occupied by the material to be moved during a material moving operation. Depending upon the type of machine performing the material movement, sensors are mounted at suitable locations on the equipment and adjusted based on extrinsic parameter calibration. Thus the mounting and calibration of the physical volume data 102 and location data 103 sensors facilitates: (1) selecting sensor locations on the material moving equipment to achieve the best field of view of the material volume, and (2) transforming the physical volume data 102 into an overhead view map of the volume of material to be moved. By way of example, the trip sequence calculator collects the physical volume data 102 and machine location data 103 in real-time from the machine-mounted sensors and integrates/fused the information using sensor fusion techniques—resulting in a point cloud representing the volume of material to be moved as well as surrounding terrain of the worksite. If the region of interest containing the material within the workspace of the equipment is smaller, hence the data is less, the subsequent operations of material flow modelling, geometry extraction and sequencing may be performed on a configured processor within a material moving equipment tasked with carrying out the material moving operation. However, in more complex cases, the acquired sensor data from the sources 101, is acquired and forwarded to a remote processor (e.g. a cloud server) for generating a current tile pattern and optimized trip sequence. The resulting tile pattern and/or optimized trip sequence are downloaded to the moving machine equipment.

An execution aspect of the current disclosure is depicted, by way of example, in FIG. 1 where a planning system 115, including the trip sequence calculator 105, renders control commands/scripts/instructions to an implement/tool controller 114 of the material moving equipment carrying out the optimized trip sequence for moving the volume of material to be moved. By way of example, a supervisory controller 108 converts the optimized trip sequence (rendered/provided by the trip sequence calculator 105) into supervisory instructions that are provided to a navigation planner 110 (controlling movements of the material moving equipment to remove specified tiles of a current tile pattern) and an implement/tool planner 111 (controlling loading of the material moving equipment from a designated tile).

Figure 2:
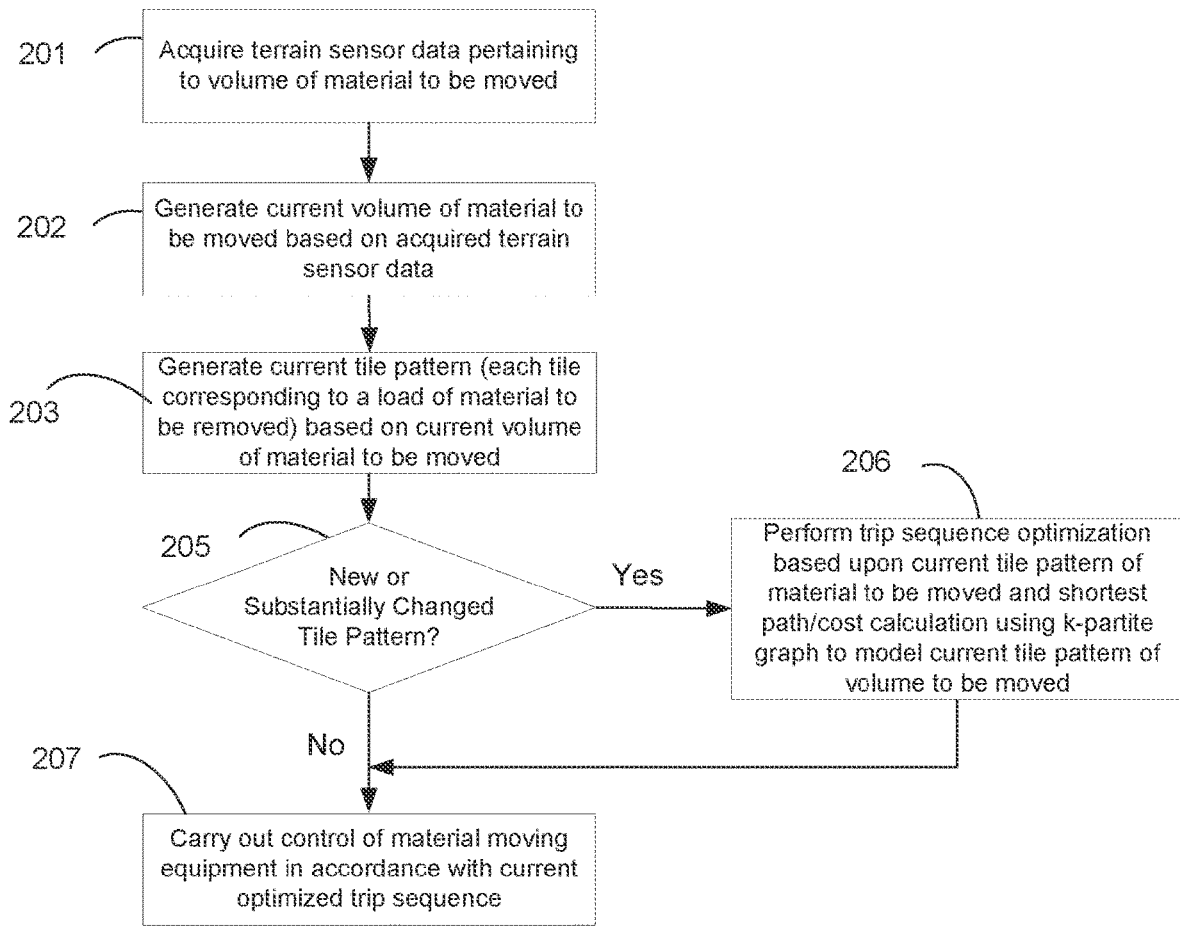
FIG. 2 is a flowchart summarizing a set of operations that are carried out by, for example, the system depicted in FIG. 1 to schedule and carry out an optimized sequence of trips between a source location and destination location for a material transfer operation in accordance with the current disclosure.

Turning to FIG. 2, a flowchart is provided that summarizes a set of operations that are carried out by, for example, the system depicted in FIG. 1 to schedule and carry out an optimized sequence of trips between a source location and destination location for a material transfer operation in accordance with the current disclosure. The operation flow summarized in FIG. 2 may be invoked at any time. However, an example of a particular event for performing such computational flow is after each loading of the material moving equipment in accordance with a currently designated tile (sub-volume of the material to be moved) from the existing tile pattern upon which a current optimized trip sequence is based.

During 201 the trip sequence calculator 105 acquires terrain sensor data from the sensor data sources 101 pertaining to a volume of material to be moved to a specified destination/dump location at a worksite. Based upon the acquired data, during 202 the trip sequence calculator 105 generates a three-dimensional mapping of the volume of material to be moved. As noted previously above, such mapping is obtained by fusing/combining physical volume data 102 and machine location data 103 indicative of the terrain in the vicinity of the volume of material to be moved. Thereafter, during 203, the trip sequence calculator 105 generates an updated current tile pattern (see FIGS. 3A and 4A described herein below) of the remaining sensed volume of material to be moved, where each tile of the updated current tile pattern corresponds to a load of material to be removed/moved by the material moving equipment during a trip sequence segment.

At 205, the trip sequence calculator 105 determines whether the updated current tile pattern substantially deviates from the remaining tile pattern of an existing tile pattern (upon which the current optimized trip sequence is based). If the updated current tile pattern differs to a substantial degree from the existing tile pattern, then the updated current tile pattern is designated as the existing tile pattern for purposes of calculating an updated trip sequence, and control passes to 206.

In accordance with the current disclosure, during 206 the trip sequence calculator 105 performs a trip sequence optimization routine based upon the existing tile pattern. By way of example, during 206 the trip sequence calculator 105 determines at least a next block of material (corresponding to a tile in the existing tile pattern) to be removed from the remaining volume of material to be moved by calculating an updated optimized trip sequence in accordance with an optimized parameter. Such optimized parameter may be one or more group of the parameters as follows: minimum cycle time, maximum productivity, least travel distance, minimum fuel consumption, and orthogonal digging or excavation.

By way of a particular example, the volume of material to be moved is considered to be made of many blocks/volumes of material corresponding to the aforementioned distinctly identified "tiles" of the existing tile pattern. Choosing which block/tile is to be moved next in the sequence (i.e. the trip sequence planning) during 206 comprises two discrete optimization steps.

First, calculations are performed for establishing an optimal discretization and the optimal direction B p (t) in which the discretized area or discretized volume of the region specifying material source is oriented based on the current position $(x_l, y_l)$ and orientation $(\theta_l(t))$ of the equipment, and the position $(x_x, y_x)$ and orientation $(\theta_x(t))$ of the location at which the material is to be dumped. The first step yields two sets of dig blocks including exposed blocks (U) and unexposed blocks (U') that are behind the exposed blocks. Blocks belonging to U' are accessible only when certain blocks of U are depleted (e.g., moved to a specified dump location such as a crusher or a truck loading location).

In the description provided below of the first step, each one of the material sources is referred to as a "pile" and geometry of the geographical area defining material source location are referred to as "pile geometry".

Based on the pile geometry obtained from the received sensor data 101, the pile is discretized resulting in a finite number of blocks (i.e. tiles of the tile pattern). The process of discretization is called tiling or tessellation—performed, for example, by edge-to-edge or non-edge-to-edge tiling. Decomposing the pile geometry into blocks involves: determining a number of blocks covering the pile geometry (during 203), and thereafter determining (during 206) orientation of the blocks for optimal coverage. The optimal orientation is the weighted average of the orientations of the edges of the pile, weighted by the polynomial degree of the length of the edges. Thus, during the first step, the pile geometry is decomposed into two types of blocks: "complete blocks" that are filled with material corresponding to a full load of the moving equipment, and "incomplete blocks" including material insufficient to completely fill a load of the moving equipment. During the first step of 206, the tiling of the blocks is solved as a locally convex optimization process to maximize the number of complete blocks. The result of the discretization of optimally oriented maximum number of filled blocks. See e.g., FIGS. 3A and 4A.

Second, operations are performed during 206 to determine an optimal sequence of paths x* that includes an optimal next dig block d* based on $\{(x_l, y_l, \theta_l(t)),(x_x, y_x, \theta_x(t)), \theta_p(t)\}$. The second step of involves finding a current "shortest path" in a complete k-partite directed graph where each segment connecting two nodes is assigned a "distance" (cost), and where k is the number of partitions in the graph, and where each partition represents groups of nodes belonging a particular one of potentially multiple piles (corresponding to the volume of material to be moved), dump locations and a starting position. Thus, the (k−1) partitions of the nodes (vertices) of the graphical representation (see FIGS. 3B and 4B) represent different sources (for example, different piles), a single partition representing a current equipment location, and a single partition representing the dump location. Different phases of the dig block development differ from each other by k and the constraints related to it.

More particularly, the blocks that result from the tiling of the blocks (e.g., FIG. 3A for a single pile and FIG. 4A for two piles of material to be moved) are designated and identified as nodes (or vertices) of a k-partite graph. See e.g., FIGS. 4A and 4B. Two nodes of the k-partite graphs represent: (1) a current location of the equipment, and (2) the dump location where a next block of material (tile) is to be moved. The nodes of the k-partite graphs that represent the blocks/tiles are connected to each other as well as the nodes representing equipment and dump locations. The nodes representing the blocks of a pile are grouped into one partition, and the nodes representing the equipment and dump locations are grouped into another group for purposes of rendering the k-partite graph used to calculate a shortest path for completing the material moving operation. Thus, if there are (k−1) piles, there will be total of k partitions in the graph, hence k-partite graph. The advantage of using a partite graph is that any search for the sequence only occurs between the partitions and not within the partitions. An example of (k=2) is shown in FIG. 3A (layout) and FIG. 3B (partitioned graph) where nodes 1-20 represent material blocks (partition 1), and nodes 21 and 22 represent equipment and dump locations (partition 2).

Figure 3B:
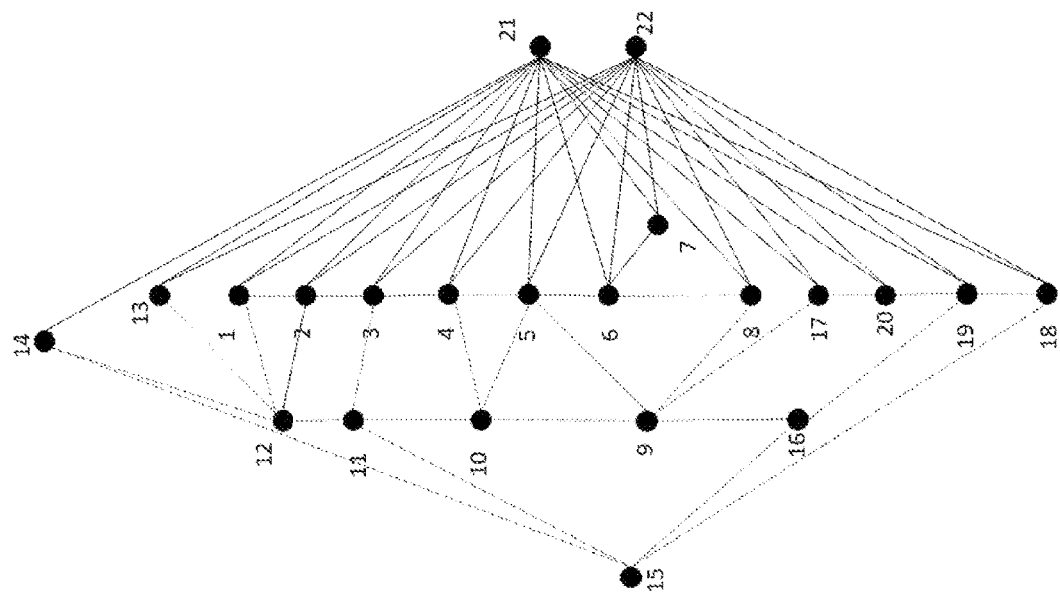
FIGS. 3A and 3B illustratively graphically depict a material movement operation in the form of an overhead view (FIG. 3A) depicting a discretization of the material at a source location and an indicated destination location, and a corresponding k-partite graph (k=2) (FIG. 3B) in accordance with the current disclosure.
Figure 4B:
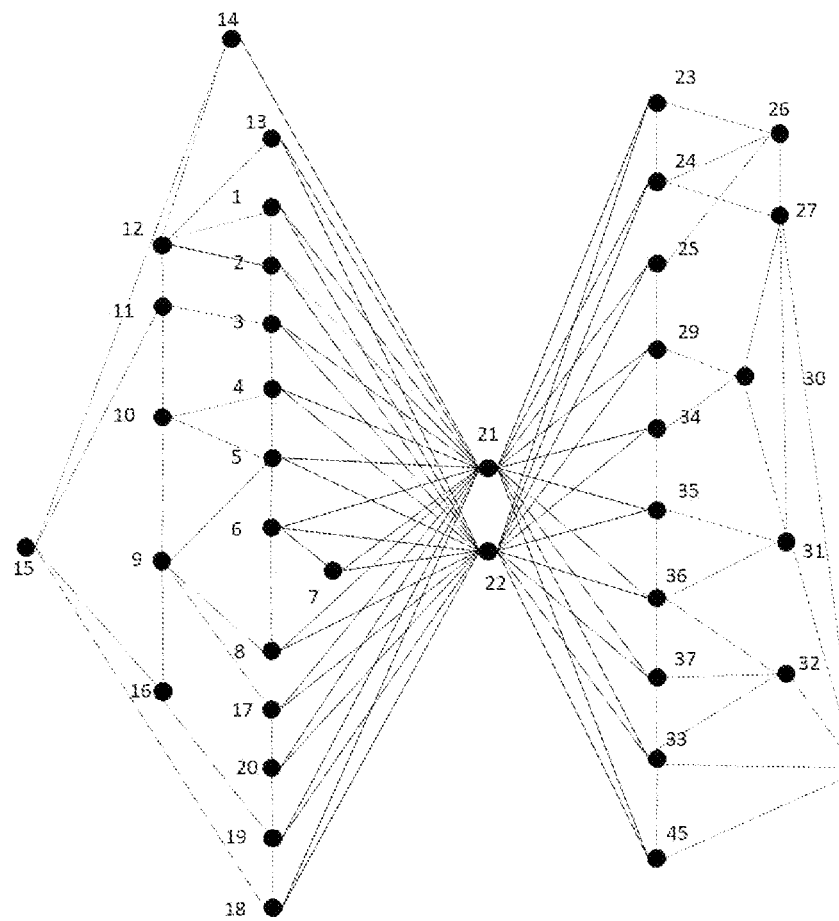

In the k-partite graphs of FIGS. 3B and 4B, edges (shown as lines) between the two partitions only exist between exposed blocks and the partition 2. Weights assigned to the edges are, for example, a linear combination of various weighted factors of a cost/distance minimization optimization criterion. During step 2 during 206, an optimal trip sequence is calculated by iteratively/recursively finding shortest total paths between the nodes of the k-partite graphs representing the tiled pattern of material to be removed, the moving equipment and the dump location. Each iteration of the operations of 206 thus yields an optimized next block (tile) to be removed from the remaining volume of material to be moved. It is noted in the FIGS. 3B and 4B, proximity between exposed and unexposed blocks are shown as dashed lines. The dashed line connections are not used for the current shortest path optimization search). The optimized path search/determination during step 2 of 206 continues until all the nodes in a partition containing the block are removed.

Because only shortest paths determined in each iteration/recursive execution (on remaining nodes of the graph after selecting a next optimized block/tile), the trip sequence for removing each of the blocks yielded by each iteration is optimal. As such, during step 2 calculations, a state of the graph is dynamic (i.e., changes as each block is removed). In that regard, the step 2 optimal path determination differs from standard shortest path determinations.

The shortest path determination is applicable to any number of piles. Such applicability is demonstrated in the additional example provided for a two-pile configuration and corresponding k-partite graph depicted in FIGS. 4A and 4B.

While estimating the optimality criteria, each iteration predicts the change in the geometry of the pile, hence this is a Markov process. As a result, it is possible to predict/reconstruct the geometry of a remaining volume of material to be moved at each step (after each block is removed) of the sequence within a single iteration of step 2 of 206. Moreover, between iterations of 206, when the currently designed trip sequence is executed by the equipment, if the trip sequence calculator 105 determines (during 205) that the pile geometry/volume sensed in real-time by the sensor data sources 101 onboard the equipment significantly differs from a predicted shift in the material as blocks are removed, the optimal sequence is recalculated during 206. On the other hand, if no significant difference is determined, then control passes directly from 205 to 207.

Continuing with the description of FIG. 2, during 207 the planning system 115 renders and provides control commands/scripts/instructions to an implement/tool controller 114 of the material moving equipment carrying out the optimized trip sequence for moving the volume of material to be moved. As noted previously above, by way of example, the supervisory controller 108 converts the optimized trip sequence rendered/provided by the trip sequence calculator 105 into supervisory instructions that are provided to the navigation planner 110 (controlling movements of the material moving equipment to remove specified tiles of a current tile pattern) and the implement/tool planner 111 (controlling loading of the material moving equipment from a designated tile). The navigation planner 110 and the implement/tool planner 111 provide instructions/commands to the implement/tool controller 114 of the material moving equipment in accordance with at least the currently selected next tile to be removed from the existing tile pattern.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for performing a movement of a material volume to a specified destination location, by a system including sensor data sources, a trip sequence planning system, and a controllable material mover, the method comprising:

acquiring, from the sensor data sources in real-time, terrain sensor data pertaining to the material volume to be moved to the specified destination location;

generating, based on the terrain sensor data, a three-dimensional mapping of the material volume to be moved;

updating, based on the three-dimensional mapping, a current tile pattern of the material volume to be moved;

determining, by performing a trip sequence optimization routine based upon the updated tile pattern, at least a next block of material to be moved from the material volume, wherein the trip sequence optimization routine is performed in accordance with a k-partite map generated from the current tile pattern, and wherein the k-partite map incorporates path limitations arising from physical accessibility of tiles of material during sequential removal of material of the material volume corresponding to the current tile pattern;

causing a controller associated with the controllable material mover to generate supervisory instructions relating to the next block of material to be moved from the material volume to the specified destination location; and using the controller, autonomously causing to be performed, by executing the supervisory instructions, a material moving operation of the controllable material mover, the material moving operation including removal of the material from a particular tile in the next block, loading of the material from the particular tile in the next block, or both.

2. The method of claim 1, wherein the generating a three-dimensional mapping is performed based upon a combination of physical volume data and location data indicating a location of a sensor acquiring the physical volume data at a time of data acquisition.

3. The method of claim 2, wherein the physical volume data is provided by sensors mounted upon the controllable material mover.

4. The method of claim 1, wherein each tile corresponds to a single load capacity of the controllable material mover.

5. The method of claim 1, wherein the material volume is arranged as a single pile, and the k-partite map is a 2-partite map.

6. The method of claim 1, wherein the material volume is arranged as k−1 piles for a k-partite map used for performing the determining the next block of material.

7. The method of claim 1, wherein the method further comprises, upon removing a load of material in accordance with the determined next block of material to be moved from the material volume, a further real-time iteration of the generating, updating, and determining operations based upon a new material volume as a result of removing the load of material.

8. The method of claim 7, comprising determining, after performing the further real-time iteration of the generating and updating operations, that an updated current tile pattern substantially deviates from a remaining tile pattern of an existing tile pattern, and thereafter performing the further real-time iteration of the determining at least a next block of material to be moved from the material volume in accordance with the updated current tile pattern.

9. The method of claim 1, wherein the determining at least a next block of material to be moved from the material volume is carried out in accordance with an optimized parameter taken from the group consisting of: minimum cycle time, maximum productivity, least travel distance, minimum fuel consumption, and orthogonal digging or excavation.

10. The method of claim 1, wherein the determining at least a next block of material to be moved includes establishing k-partite graphs, representing discretization and direction of tiles of the current tile pattern, and includes an identification of exposed tiles and unexposed tiles that are behind the exposed tiles.

11. A system configured for performing a method for movement of a material volume to a specified destination location, the system comprising:
    sensor data sources;
    a trip sequence planning system; and
    a controllable material mover,
    wherein the trip sequence planning system includes a processor and a non-transitory computer readable medium including computer-executable instructions that, when executed by the processor, facilitate carrying out a method comprising:
        acquiring, from the sensor data sources in real-time, terrain sensor data pertaining to the material volume to be moved to the specified destination location;
        generating, based on the terrain sensor data, a three-dimensional mapping of the material volume to be moved;
        updating, based on the three-dimensional mapping, a current tile pattern of the material volume to be moved;
        determining, by performing a trip sequence optimization routine based upon the updated tile pattern, at least a next block of material to be moved from the material volume, wherein the trip sequence optimization routine is performed in accordance with a k-partite map generated from the current tile pattern, and wherein the k-partite map incorporates path limitations arising from physical accessibility of tiles of material during sequential removal of material of the material volume corresponding to the current tile pattern; and
        causing a controller associated with the controllable material mover to generate supervisory instructions relating to the next block of material to be moved from the material volume to the specified destination location; and
        using the controller, autonomously causing to be performed, by executing the supervisory instructions, a material moving operation of the controllable material mover, the material moving operation including removal of the material from a particular tile in the next block, loading of the material from the particular tile in the next block, or both.

12. The system of claim 11, wherein the generating a three-dimensional mapping is performed based upon a combination of physical volume data and location data indicating a location of a sensor acquiring the physical volume data at a time of data acquisition.

13. The system of claim 12, wherein the physical volume data is provided by sensors mounted upon the controllable material mover.

14. The system of claim 11, wherein each tile corresponds to a single load capacity of the controllable material mover.

15. The system of claim 11, wherein the material volume is arranged as a single pile, and the k-partite map is a 2-partite map.

16. The system of claim 11, wherein the material volume is arranged as k–1 piles for a k-partite map used for performing the determining the next block of material.

17. The system of claim 11, wherein the method further comprises, upon removing a load of material in accordance with the determined next block of material to be moved from the material volume, a further real-time iteration of the generating, updating, and determining operations based upon a new material volume as a result of removing the load of material.

18. The system of claim 17, comprising determining, after performing the further real-time iteration of the generating and updating operations, that an updated current tile pattern substantially deviates from a remaining tile pattern of an existing tile pattern, and thereafter performing the further real-time iteration of the determining at least a next block of material to be moved from the material volume in accordance with the updated current tile pattern.

19. The system of claim 11, wherein the determining at least a next block of material to be moved from the material volume is carried out in accordance with an optimized parameter taken from the group consisting of: minimum cycle time, maximum productivity, least travel distance, minimum fuel consumption, and orthogonal digging or excavation.

20. The system of claim 11, wherein the determining at least a next block of material to be moved includes establishing k-partite graphs, representing discretization and direction of tiles of the current tile pattern, and includes an identification of exposed tiles and unexposed tiles that are behind the exposed tiles.

* * * * *